United States Patent [19]

Weaver et al.

[11] 4,224,502
[45] Sep. 23, 1980

[54] AUTOMATIC WELDING FEEDER SHUT OFF

[75] Inventors: Edgar C. Weaver, St. Charles; James H. Vaughan, Town & Country, both of Mo.

[73] Assignee: ACF Industries, Incorporated, New York, N.Y.

[21] Appl. No.: 938,566

[22] Filed: Aug. 31, 1978

[51] Int. Cl.² .............................................. B23K 9/32
[52] U.S. Cl. .............................. 219/137.2; 200/61.47; 219/137.7
[58] Field of Search ............. 219/137.2, 137.7, 130.21; 200/61.47, 81.6, 81 HG

[56] References Cited

U.S. PATENT DOCUMENTS

| | | | |
|---|---|---|---|
| 3,143,633 | 8/1964 | Wayleigh | 219/137.2 |
| 3,227,866 | 1/1966 | Peters | 200/61.47 |
| 3,555,219 | 1/1971 | Johnson | 200/61.47 |

Primary Examiner—E. A. Goldberg
Attorney, Agent, or Firm—Henry W. Cummings

[57] ABSTRACT

In accordance with the present disclosure, the weld wire is passed through a pivoted switch located upstream of a welding machine. When the end of the weld wire passes through the pivoted switch, the switch is biased to pivot into a non-contact or open position. The open position of the switch shuts off the current to the welding arc and to the feed rolls and prevents the weld wire from melting back to the contact tip and fusing to the tip.

4 Claims, 4 Drawing Figures

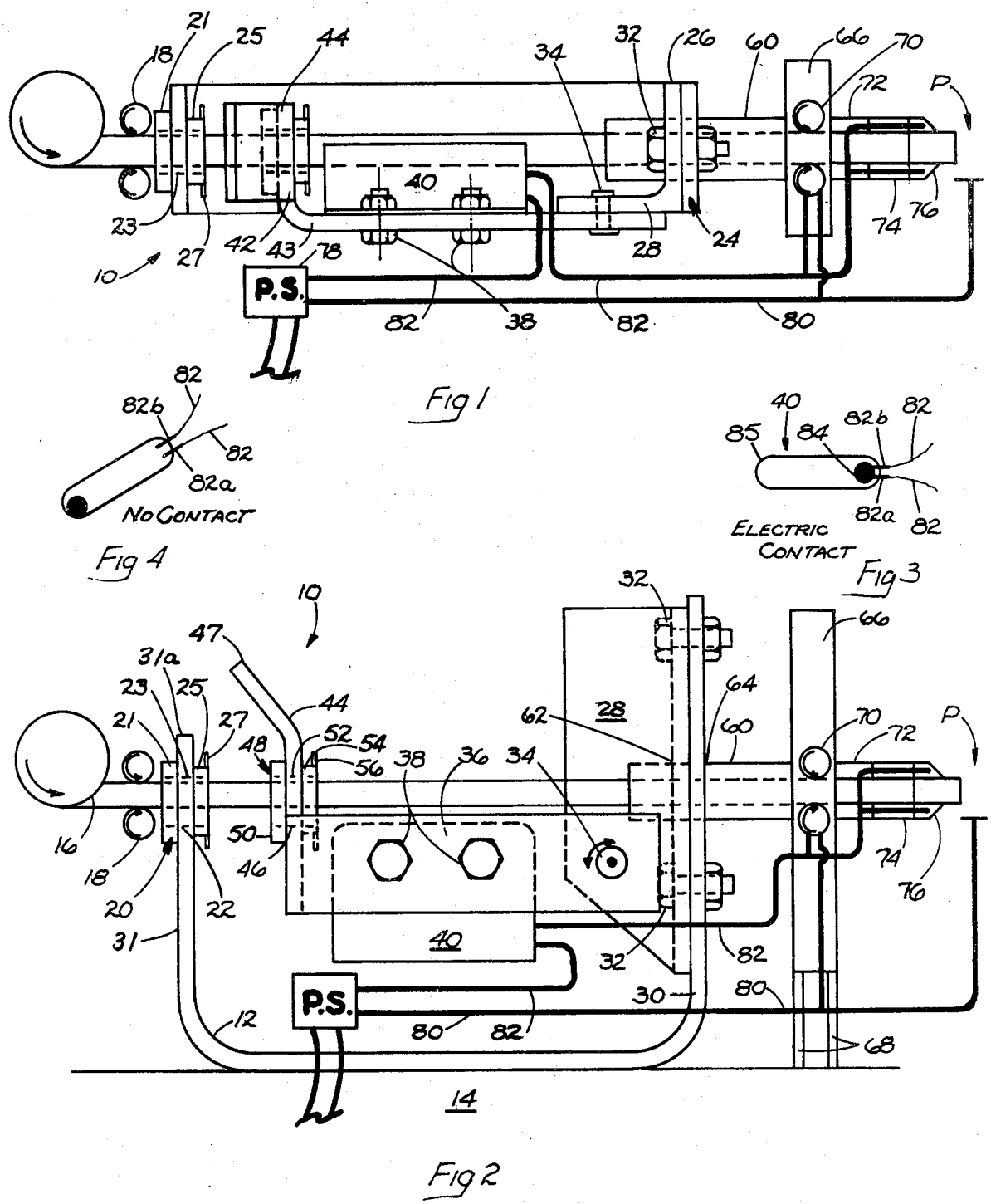

AUTOMATIC WELDING FEEDER SHUT OFF

BACKGROUND OF THE INVENTION

This invention relates to welding.

In an automatic or semi-automatic welding machine, if the supply of weld wire runs out while the welding arc is being sustained, the wire stops its normal forward movement through the contact tip of the welding gun. When the wire movement stops while the welding arc is sustained, the wire melts back to the welding contact tip and fuses to the tip. The fused tip must then be eliminated by discarding the tip and inserting a new one, or by breaking loose the fused wire from the tip. In either case welding time is lost, and often an added expense for the tip results.

SUMMARY OF THE INVENTION

In accordance with the present invention, the weld wire is passed through a pivoted switch located upstream of the welding machine. When the end of the weld wire passed through the pivoted switch, the switch is biased to pivot into a non-contact or open position. The open position of the switch shuts off the current to the welding arc and to the feed rolls and prevents the weld wire from melting back to the contact tip and fusing to the tip.

THE DRAWINGS

FIG. 1 is a schematic plan view of the welding switch assembly of the present invention;

FIG. 2 is a schematic side elevation view of the welding switch assembly of the present invention;

FIG. 3 is a schematic view of a mercury switch in closed position.

FIG. 4 is a schematic view of a mercury switch in open position.

DESCRIPTION OF PREFERRED EMBODIMENTS

The welding switch assembly of the present invention is indicated generally at 10 in the drawings and includes a generally "U"-shaped mounting bracket 12 resting upon a suitable bench or frame 14. Weld wire 16 is passed through optional idler rolls 18 and through a bushing 20 mounted in an opening 22 in a leg 31 of mounting bracket 12. Bushing 20 is preferably mounted with clearance through opening 22 so that bushing 20 can rotate and more uniform bushing wear is obtained. Bushing 20 includes a head portion 21, a body portion 23 of smaller diameter passing through opening 22, and a tip 25 including a keeper 27.

An angle-shaped bracket 24 having legs 26 and 28 is attached to leg 30 of "U"-shaped bracket 12 with fasteners 32. Bushing 20 is supported by leg 31. Pivotably attached to leg 28 with a fastener 34 is a switch bracket 36. Fasteners 38 hold a contact switch 40 attached to switch bracket 36.

The distal end 42 of switch bracket 36 is bent approximately 90° as indicated at 43 and is integrally attached to a weld wire support 44. Weld wire support 44 includes an opening 46 into which is inserted a weld wire support bushing 48. Bushing 48 is constructed similarly to bushing 20 and includes a head portion 50, a body portion 52 and a tip 54 including a keeper 56. In normal operating position, bushings 20 and 48 support weld wire 16 on its path toward the weld point.

The upper end 47 of weld wire support 44 is bent and provides a stop which engages the top 31a of leg 31 in inoperative position.

A nozzle 60 is located in respective openings 62 and 64 in legs 26 and 30. Nozzle 60 directs the weld wire toward a conventional welding wire feed machine 66 having supports 68. The wire feed machine 66 is of conventional construction and does not form a part of the present invention. An example of a suitable welding machine is Hobart Semi-automatic Welder No. 27. The welding assembly further includes feed rolls 70, a sheath 72 extending outwardly toward the weld point, a weld nozzle body 74 and a welding tip 76. Details of such welding assemblies are well-known in the art. For example, Hobart Technical Manual No. TM 437 dated Feb. 10, 1976, incorporated into the present application by this reference, may be referred to for a detailed explanation of a typical unit; Hobart Brothers Company, Troy, Ohio 45373. Sheath 74 and nozzle body 76 are conductive and optionally may include water cooling conduits (not shown).

Contact wires 80 and 82 extend from a power source P.S. respectively to work piece P and to switch 40. From switch 40, wire 82 extends to control the current to feed rolls 74 and to sheath 72 and nozzle body 74, and to weld wire 16.

As mentioned above, in the Background of the Invention, in an automatic or semi-automatic welding machine, if the supply of weld wire 16 runs out while the welding arc is being sustained, the wire stops its normal forward movement through the contact tip of the welding gun. When the wire movement stops while the welding arc is sustained, the wire melts back to the welding contact tip 76 and fuses to the tip. The fused tip must then be eliminated by discarding the tip and inserting a new one, or by breaking loose the fused wire from the tip. In either case, welding time is lost, and often an added expense for the tip results. Switch 40 is designed to overcome this problem.

One suitable switch which may be utilized for switch 40 is a mercury contact switch. In the horizontal operative position, conductive mercury 84 in vial 85 (FIG. 3) is in contact with contacts 82a and 82b on respective leads 80 and 82 leading to feed rolls 66.

However, when the end of the weld wire passes through bushing 50, bracket 36 and switch 40 pivot about fastener 34 until the end 47 of wire support 44 abuts the upper end 31a of leg 31. Switch 40 thus assumes the position shown in FIG. 4. Mercury 84 is out of contact with lead ends 82a and/or 82b. This open circuit turns off rolls 70 and the welding circuit passing to tip 76. Thus the weld arc is stopped and the further movement of the weld wire stops. Thus the weld wire is not fused back to the contact tip. Thus, when the weld wire runs out, there is not a loss of time due to fusion of the weld wire to the contact tip.

The particular switch may vary from the mercury switch illustrated. A switch that is closed in one position and biased to an open position by gravity or a spring may be used. Suitable alternative switches will be apparent to those skilled in the art.

Also, switch 40 need not turn off all the electrical current to the welding assembly. Switch 40 only need be connected in series with the arc forming current and also preferably with feed rolls 70, to prevent feeding more weld wire into the work piece after the arc current has been turned off. Such simple series connections are readily made by electricians familiar with conventional welding machines such as the Hobart unit mentioned above.

When a new roll of weld wire 16 is fed through bushings 20 and 48, nozzle 60, rolls 70 and nozzle body 74, operation can be resumed in the normal manner with switch 40 in the position shown in FIG. 3.

What is claimed is:

1. In a welding assembly including a roll of weld wire, a weld wire support including a generally vertically extending support having means attached thereto for supporting weld wire passing therethrough; at least one pair of feed rolls for moving said weld wire toward a work piece to be welded; a welding nozzle body and a welding tip; the improvement comprising a switch assembly including a switch arm pivotably mounted upon said weld wire support; said switch arm having a mercury switch mounted thereon; said switch having leads connected thereto in series with welding current for forming an arc for welding; said switch arm including switch support means supported by said weld wire in its path toward the work piece in a first position; the mercury in said switch in said first position maintaining electrical current flow between at least a pair of contacts in the switch to the work piece to form a welding arc; and in a second open position said mercury being out of contact with at least one of said contacts and thereby stopping the flow of current to the welding arc; whereby when the end of said weld wire passes through said switch support means, said mercury switch pivots vertically due to gravity about said weld wire support and said mercury moves from said first closed position to said second open position and thereby stops flow of current flow to the arc.

2. A welding assembly according to claim 1 wherein said switch also turns off said feed rolls when it pivots to open position.

3. A welding assembly according to claim 1 wherein said switch is mounted upon a switch support which is pivotably mounted upon said weld wire support.

4. In a welding assembly including a roll of weld wire, a weld wire support including a generally vertically extending support having weld wire support means attached thereto for supporting weld wire passing therethrough; at least one pair of feed rolls for moving said weld wire toward a work piece to be welded; a welding nozzle body and a welding tip; the improvement comprising a switch assembly including a first switch support pivotably mounted upon said weld wire support; a mercury switch mounted upon said switch support, said switch having leads connected thereto in series with welding current for forming an arc for welding; said switch assembly including a second weld wire support means supported by said weld wire in its path toward the work piece; third wire support means located upstream of said second weld wire support means; said second weld wire support means including a lateral extension; the mercury in said switch in a first closed position maintaining electrical current flow between at least a pair of contacts in said switch and thus to the work piece to form a welding arc; and in a second open position said mercury being out of contact with at least one of said contacts and thereby stopping the flow of current to the welding arc; whereby when the end of said weld wire passes through said second weld wire support means, said mercury switch pivots vertically due to gravity about said weld wire support, said extension engages a portion of said third weld wire support means, and said mercury moves from said first, closed position to said second, open position, thereby stopping flow of current flow to the arc and turning off said feed rolls, thereby avoiding said weld wire fusing to said tip when the weld wire runs out.

* * * * *